(12) United States Patent
Tamura et al.

(10) Patent No.: US 7,475,338 B1
(45) Date of Patent: Jan. 6, 2009

(54) METHOD FOR DUAL OPERATIONAL MODE PARSING OF A XML DOCUMENT

(75) Inventors: Kento Tamura, Shinagawa-ku (JP); Naohiko Uramoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/961,475

(22) Filed: Dec. 20, 2007

(51) Int. Cl.
*G06F 17/00* (2006.01)

(52) U.S. Cl. ........................... 715/234; 715/200

(58) Field of Classification Search ........... 715/234, 715/200
See application file for complete search history.

(56) References Cited

U.S. PATENT DOCUMENTS

| | | | |
|---|---|---|---|
| 6,763,499 B1 * | 7/2004 | Friedman et al. | 715/240 |
| 6,880,125 B2 | 4/2005 | Fry | |
| 6,959,415 B1 * | 10/2005 | Soderberg et al. | 715/234 |
| 7,013,245 B2 * | 3/2006 | Kotter et al. | 715/242 |
| 7,065,561 B2 | 6/2006 | Fry et al. | |
| 2004/0261019 A1 * | 12/2004 | Imamura et al. | 715/513 |
| 2007/0113172 A1 * | 5/2007 | Behrens et al. | 715/513 |

OTHER PUBLICATIONS

Daum, Berthold, Parsing XML documents patially with Stax, Dec. 2, 2003, IBM, pp. 1-4.*
Guo Ping et al., Parsing XML Efficiently, Oct. 2003, Oracle, pp. 1-9.*

* cited by examiner

*Primary Examiner*—William L. Bashore
*Assistant Examiner*—Manglesh M Patel
(74) *Attorney, Agent, or Firm*—Cantor Colburn LLP; Vazken Alexanian

(57) ABSTRACT

Within exemplary embodiments of the present invention a solution is provided for the abbreviated parse scanning of a XML document, thus providing improved processing performance over traditional full parsing processing methods. As such, during an XML document parsing operation, from the start of the document to a specific segment of the document wherein desired information resides, only the minimal processing necessary is implemented to achieve a correct parse of the specified segment, wherein thereafter a full parse operation only for desired information is carried out over the specified segment in order to retrieve any desired information from the XML document.

3 Claims, 3 Drawing Sheets

METHOD FOR DUAL OPERATIONAL MODE PARSING OF A XML DOCUMENT

BACKGROUND OF THE INVENTION

1. Field of the Invention

This invention relates to methodologies directed to the processing of XML documents, and particularly to the performance of abbreviated parsing of XML documents.

2. Description of the Background

XML parsers are required to analyze XML documents and thereafter convert the analyzed document into predetermined information formats. Currently, two classifications XML parsers exist: validating and non-validating parsers. Validating parsers performs a series of rigorous checks upon a XML document in order to ensure that the document is in compliance with rules specified within a XML schema language. On the other hand, non-validating parsers are engaged to simply verify that an XML document is in compliance with the general rules of the XML 1.0 specification (i.e., the XML document is in compliance with well-formed document constraints).

According to the XML 1.0 specification, a XML document must be parsed from the beginning of the document to the end of the document. Thus, parsing from the middle of a document is not possible. The reason being is that even if parsing were to be started from a particular point within a document, the document context at the point would not be clear unless an analysis of the document is made from the start of the document up to the point, or perhaps from the point to the end of the document.

SUMMARY OF THE INVENTION

The shortcomings of the prior art are overcome and additional advantages are provided through the provision of a method for dual operational mode parsing of a XML document. The method comprises retrieving a XML document, identifying a segment within the XML document containing information that is desired for further processing, and determining a primary termination condition for terminating an abbreviated parsing scan operation that is performed upon the retrieved XML document, wherein the abbreviated parsing scan operation comprises the cursory scanning of the constructive elements of the XML document, further the primary termination condition for the abbreviated parsing scan operation is correlated to the beginning of the segment within the XML document containing the information that is desired for further processing.

The method also comprises determining a secondary termination condition for terminating a full parsing scan operation that is performed upon the retrieved XML document, wherein the secondary termination condition for the full parsing scan operation is correlated to the end of the segment within the XML document containing the information that is desired for further processing, initiating an abbreviated parsing scan operation upon the XML document, the abbreviated parsing scan operation being ended upon the occurrence of the primary termination condition, initiating a full parsing scan operation upon the XML document upon the termination of the abbreviated parsing scan operation, the full parsing scan operation being ended upon the occurrence of the secondary termination condition, wherein primary and secondary termination conditions are based upon a number of occurrences of an element, and retrieving the information from the XML document that is desired for further processing.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
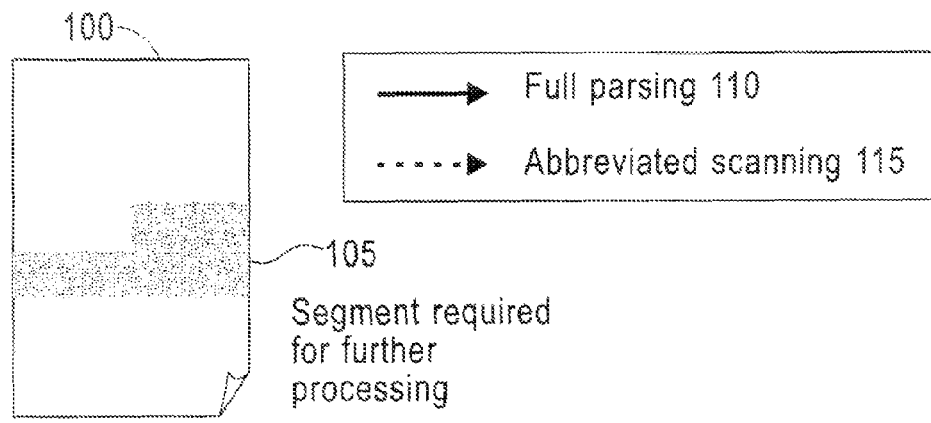
FIGS. 1A-1C illustrate a XML document (FIG. 1A) that is processed using prior art methods (FIG. 1B) and the methodology of in accordance with exemplary embodiments of the present invention (FIG. 1C). Suppose that information represented in gray parts in the figures is required for further processing.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the exemplary embodiment of the present invention can be implemented within a conventional computing processing system environment comprising hardware and software elements. Specifically, the methodologies of the present invention can be implemented to program a conventional computer system in order to accomplish the prescribed tasks of the present invention as described below.

XML documents that are processed in accordance with exemplary embodiments of the present invention can be delivered to a XML document processing system either via local storage devices or networked devices that are in communication with the XML document processing system. Exemplary embodiments of the present invention are directed to non-validating XML processing operations.

Often, systems that process XML documents only require selected information from a particular segment of the document rather than all of the information contained in the document. However, even in such a case, the parsing of the XML document is carried out from the top (i.e., the beginning) of the document, thus resulting in unnecessary parsing cost for the parsing operation. Further, since current parsers are designed to operate in a single processing thread, even if a computer has multiple cores only one CPU core is employed at a time for parsing operations.

Within exemplary embodiments of the present invention, rather than performing a full XML specification parse from the top of the document to the segment of the document containing the desired information (i.e., performing a full parsing operation), a solution is provided for the abbreviated parse scanning of a XML document, thus providing improved processing performance over traditional full parsing processing methods. As such, during an XML document parsing operation, from the start of the document to the specific segment of the document wherein the desired information resides, the performance of the minimal processing necessary is implemented to achieve a correct parse of the specified segment is necessitated, wherein thereafter a full parse operation is carried out over the specified segment.

Since according to XML specifications XML document parsing must commence from the beginning of the document, in order to reduce wasted parsing processing time and cost, a minimal (i.e., abbreviated) parsing operation is performed from the start of the document to the segment of the document wherein needed information resides. The objective of abbreviated parse scanning is to analyze only the general construction of a XML document (e.g., such as the tag context, attribute context, comment context, etc.) There are many differences between abbreviated parse scanning operations and traditional full parsing operations. Within an abbreviated parse scanning operation only the general construction of a XML document is processed, thus no validation of characters used in element names, attribute names, text, processing contents or in comments is performed. Further, no checking of start and end tag correlation is performed, neither is the processing of character reference or content entity reference is performed. Yet further, no results of parsing are passed on to other modules (such as DOM nodes or SAX events), neither is a validation against schemas is performed. Due to these simplifications, abbreviated parse scanning in accordance with exemplary embodiments of the present invention results in faster processing times than a traditional full parse scanning operation.

Figure 1B:
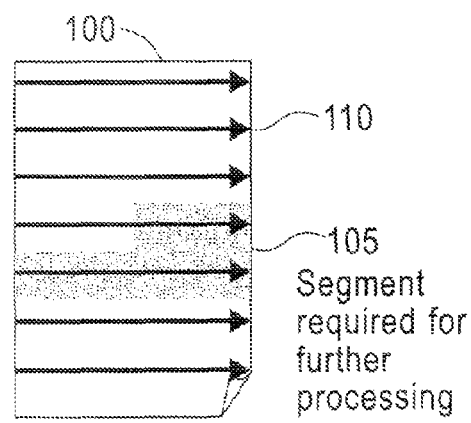
Figure 1C:
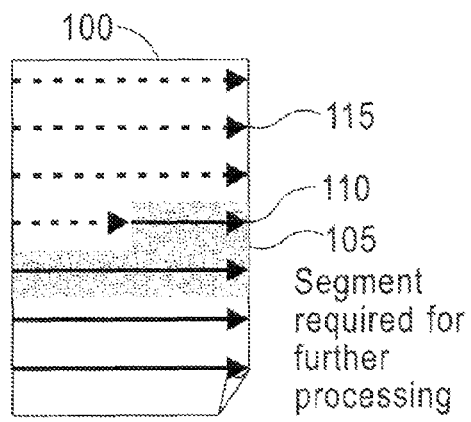

Within exemplary embodiments of the present invention simple parsing scan operations can be employed in the parsing of a XML document. As shown in FIGS 1A-1C, a XML document 100 is retrieved, wherein that information represented in gray parts in the figures represents information that is required for further processing. Within the XML document 100, a segment of the document 105 is identified as containing information that is to be retrieved and utilized for further processing. As shown in FIG. 1B, a traditional prior XML document parser would initiate a full parsing scan operation 110 in a linear manner and process the document 100 from the beginning of the document 100 over the identified segment 105 containing the desired information until the end of the document 100.

An abbreviated parsing scan operation 115 is initiated at the top of the XML document 100 and a cursory scan of the document 100 is carried out until the identified segment 105 is reached. At this point, the abbreviated parsing scan operation 115 is terminated and a full parsing scan operation 110 is initiated. The full parsing scan operation 110 can be carried out until reaching the end of the XML document 100 or terminated upon reaching the end of the identified document segment 105.

When using an abbreviated parse scanning operation at some point the abbreviated parse scanning operation must cease and from that point a full parse scanning operation must commence. For this reason, termination conditions are applied as an indicator to an XML document processor to end an abbreviated parse scanning operation. Termination conditions for abbreviated parse scanning operations vary according to the particular usage situation they are enacted within. Within exemplary embodiments of the present invention a termination condition can be based upon the hierarchical relationship or number of occurrences of a specific element within a XML document. Also, within a situation where a particular segment of an XML document is specified (e.g., in XPath), only the specified segment is fully parsed. Additionally, termination conditions can be based on a proportion of the total size of the document or based upon a specified byte position or a range of values in the vicinity of the byte position of the position. Terminal condition scan are also applied to full parsing scan operations.

For example, consider the case where only the <price> element is required from to be retrieved from an XML document 100. As described above, for the abbreviated parse scan operation processing is applied such that termination condition is set to execute on the occurrence of the <price> element tag. By processing according to the following method, the <price> tag only can be quickly extracted. First, an abbreviated parse scan operation 115 is initiated from the beginning of the document 100. In the instance that the <price> element tag is encountered the abbreviated parse scanning operation 115 is terminated. From this point on for the one element tag <price> only a full parse scan 110 is performed. Thereafter, after the parsing of element <price> is complete, then the full parse scanning operation 110 also terminates.

Figure 2:
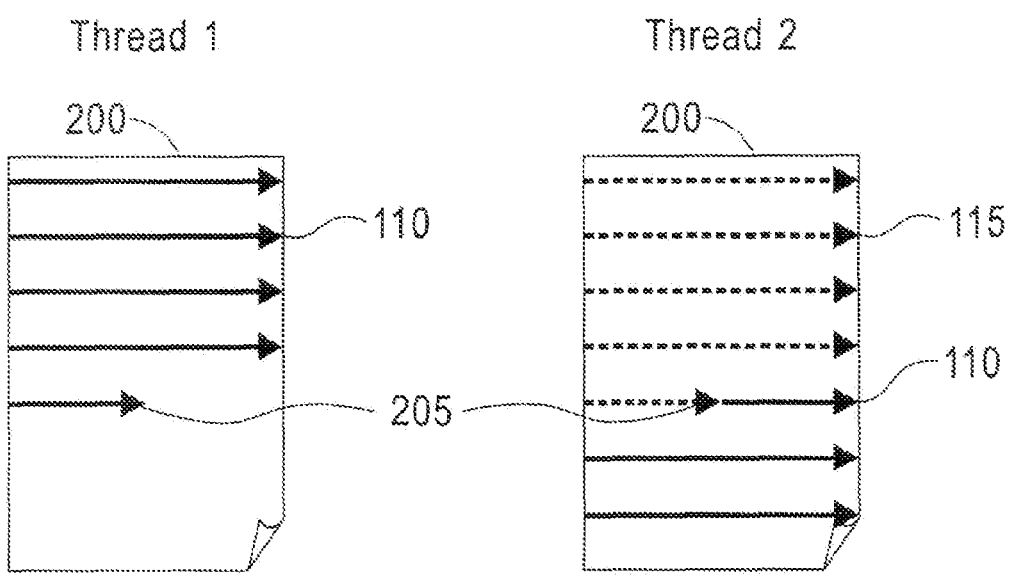
FIG. 2 illustrates one example of a XML document that is processed within a multi-threaded processing environment.

FIG. 2 shows a further exemplary embodiment of the present invention wherein a single document is parsed using two processing threads. In thread 1 a full parse scan 110 is performed on the XML document 200 from the beginning of the document 200 as far as a specific point 205. As shown in thread 2, an abbreviated parse scan operation 115 is performed to the same specified point 205 within the document, and from that point on a full parse scan operation 110 is performed. Within yet further exemplary embodiments of the present invention in the instance that three or more threads were employed, the thread performing the abbreviated parse scan 115 will initiate multiple threads for the full parse scan operation 110.

For example, consider a parallel parsing scan operation where abbreviated parse scanning is implemented wherein a two-thread parse is performed upon a XML document 200 and where in the abbreviated parse scanning operation 115 is n times faster than full parse scanning operation 110, wherein r=n/(2n−1). In thread 1, a full parse is performed for only a proportion of the full size of the document r (which is <1). Within thread 2, an abbreviated parse scan is performed on the proportion r of the document 200 and the remainder of the document 200 is fully parsed 110. Thus, as shown in FIG. 2, within thread 1, the termination condition "a full parse is performed until the first start tag after the proportion of the document r has been reached" is applied. Within thread 2, the termination condition "processing is changed to full parsing at the first start tag after the proportion of the document r has been reached" is applied.

Figure 3:
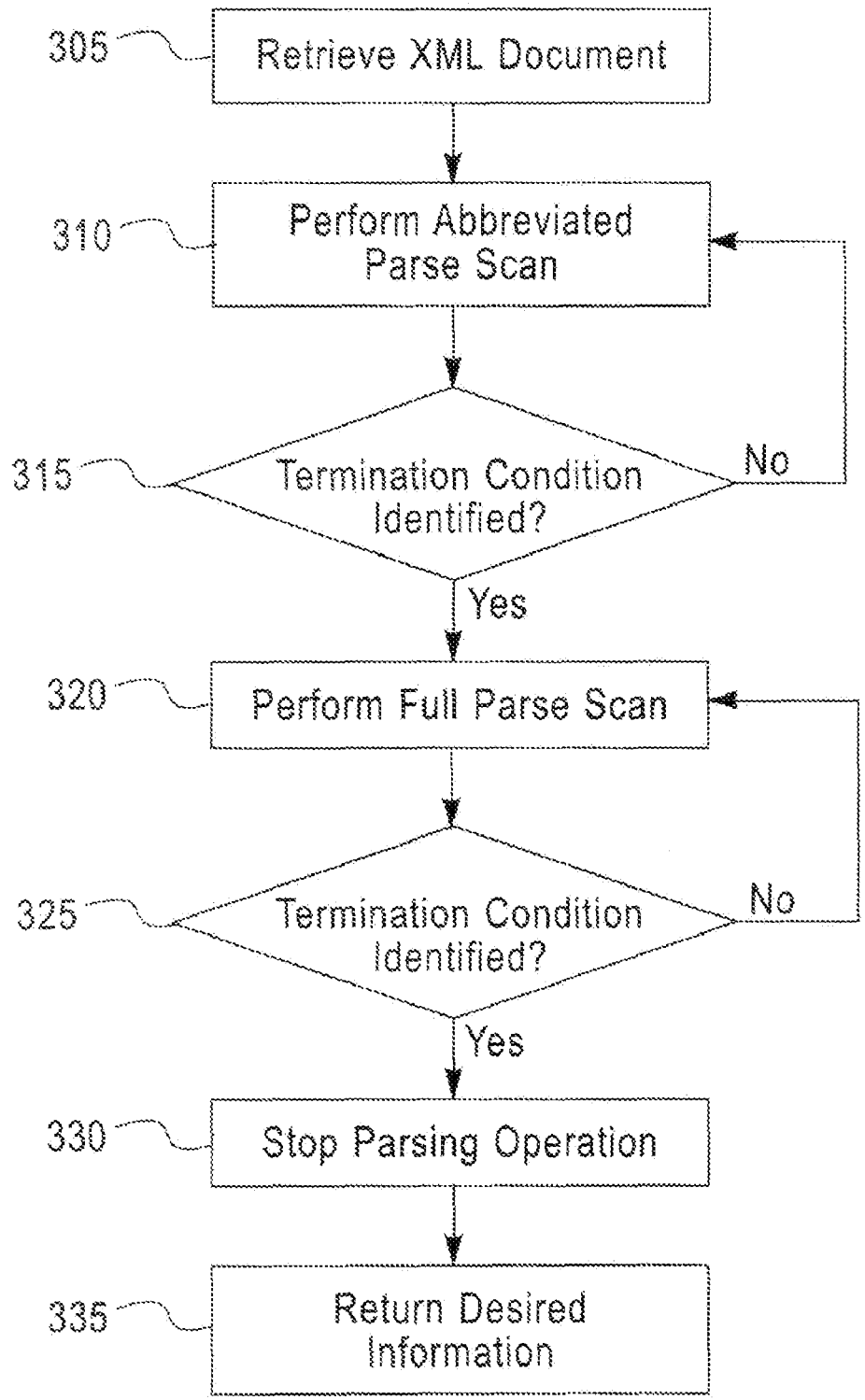
FIG. 3 illustrates a flow diagram detailing a method for abbreviated and full parsing scanning in accordance with exemplary embodiments of the present invention.

FIG. 3 shows a flow diagram detailing an exemplary method for performing a dual operational mode parse scan operation in accordance with exemplary embodiments of the present invention. At step 305, a XML document is retrieved for processing. At step 310 an abbreviated parse scan operation 115 is performed upon the XML document. At step 315 a determination is made as to whether a termination condition has occurred during the abbreviated parse scanning operation 115. In the event that no termination condition has occurred, then the abbreviated parse scan operation 115 continues. In the even that a termination condition has occurred then the abbreviated parse scanning operation 115 is ended and step 320 a full parse scan operation 110 is initiated upon the XML document.

At step 325 a determination is made as to if a termination condition has occurred. In the even that a termination condition has not occurred then the full parse scanning operation 110 continues. In the event that a termination event has occurred then the full parse scan operation 110 is ended (step 330) and the desired XML document information is retrieved for further processing (step 335).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for dual operational mode parsing of a XML document, the method comprising:

Retrieving a XML document;

Identifying a segment within the XML document containing information that is desired for further processing;

Determining a primary termination condition for terminating an abbreviated parsing scan operation that is performed upon the retrieved XML document, wherein the abbreviated parsing scan operation comprises the cursory scanning of the constructive elements of the XML document, further the primary termination condition for the abbreviated parsing scan operation is correlated to the beginning of the segment within the XML document containing the information that is desired for further processing;

Determining a secondary termination condition for terminating a full parsing scan operation that is performed upon the retrieved XML document, wherein the secondary termination condition for full parsing scan operation is correlated to the end of the segment within the XML document containing the information that is desired for further processing;

Initiating an abbreviated parsing scan operation upon the XML document, the abbreviated parsing scan operation being ended upon the occurrence of the primary termination condition;

Initiating a full parsing scan operation upon the XML document upon the termination of the abbreviated parsing scan operation, the full parsing scan operation being ended upon the occurrence of the secondary termination condition, wherein primary and secondary termination conditions are based upon a number of occurrences of an element; and Retrieving the information from the XML document that is desired for further processing.

2. The method of claim 1, wherein the abbreviate parsing scan operation comprises the parsing scan of element tags, element tag context, attribute context, and comment context comprised within the retrieved XML document.

3. The method of claim 1, wherein the abbreviated parsing scan operation and full parsing scan operation are executed within a multi-thread processing environment.

* * * * *